(12) United States Patent
Böhringer et al.

(10) Patent No.: US 10,851,250 B2
(45) Date of Patent: Dec. 1, 2020

(54) UV-CURABLE COMPOSITION FOR COATING OR PRINTING OF A SUBSTRATE AND/OR A SUBSTRATE SURFACE

(71) Applicant: Marabu GmbH & Co. KG, Tamm (DE)

(72) Inventors: Oliver Böhringer, Winnenden (DE); Jochen Rupp, Tamm (DE)

(73) Assignee: Marabu GmbH & Co. KG, Tamm (DE)

( * ) Notice: Subject to any disclaimer, the term of this patent is extended or adjusted under 35 U.S.C. 154(b) by 0 days.

(21) Appl. No.: 16/374,791

(22) Filed: Apr. 4, 2019

(65) Prior Publication Data

US 2019/0309179 A1 Oct. 10, 2019

(30) Foreign Application Priority Data

Apr. 6, 2018 (DE) .................. 10 2018 205 210

(51) Int. Cl.
| | |
|---|---|
| C08F 2/46 | (2006.01) |
| C08F 2/50 | (2006.01) |
| C08G 61/04 | (2006.01) |
| C09D 11/101 | (2014.01) |
| C08F 20/18 | (2006.01) |
| C08F 20/36 | (2006.01) |
| C08K 5/07 | (2006.01) |
| C08K 5/357 | (2006.01) |
| C08K 5/5397 | (2006.01) |
| C09D 11/037 | (2014.01) |
| C09D 11/107 | (2014.01) |
| C09D 133/08 | (2006.01) |
| C09D 133/10 | (2006.01) |

(52) U.S. Cl.
CPC .......... *C09D 11/101* (2013.01); *C08F 20/18* (2013.01); *C08F 20/36* (2013.01); *C08K 5/07* (2013.01); *C08K 5/357* (2013.01); *C08K 5/5397* (2013.01); *C09D 11/037* (2013.01); *C09D 11/107* (2013.01); *C09D 133/08* (2013.01); *C09D 133/10* (2013.01)

(58) Field of Classification Search
CPC ... C09D 11/101; C09D 11/107; C09D 11/037; C09D 133/10; C09D 133/08; C08F 20/18; C08F 20/36; C08K 5/5397; C08K 5/07; C08K 5/537
USPC ........... 522/75, 74, 71, 189, 184, 6, 1; 520/1
See application file for complete search history.

(56) References Cited

U.S. PATENT DOCUMENTS

| | | | |
|---|---|---|---|
| 8,940,804 B2 | 1/2015 | Rrahimi | |
| 2017/0145231 A1 * | 5/2017 | Blaskett | ............... C09D 11/101 |

FOREIGN PATENT DOCUMENTS

| | | | |
|---|---|---|---|
| DE | 602005005380 T2 | 4/2009 | |
| EP | 3 067 395 A1 | 9/1916 | |
| EP | 2 439 244 A1 | 4/2012 | |
| EP | 2 738 226 A1 | 6/2014 | |
| EP | 2738226 A1 * | 6/2014 | ............ C09D 11/30 |
| EP | 2546313 B1 | 8/2014 | |
| EP | 2563869 B1 | 8/2015 | |
| WO | 2007/129017 A1 | 11/2007 | |
| WO | 2011/135089 A1 | 11/2011 | |
| WO | 2015/173552 A1 | 11/2015 | |
| WO | WO-2015173552 A1 * | 11/2015 | ............... B41J 2/01 |

* cited by examiner

*Primary Examiner* — Jessica Whiteley
(74) *Attorney, Agent, or Firm* — DLA Piper LLP (US)

(57) ABSTRACT

A UV-curable composition for coating or printing, in particular digital printing, of a substrate and/or a substrate surface, includes a monofunctional acrylate monomer/methacrylate monomer with a substituted or unsubstituted monocycloaliphatic hydrocarbon radical, at least one monofunctional acrylate monomer/methacrylate monomer with a substituted or unsubstituted heterocyclic, non-aromatic organic radical, at least one monofunctional acrylate monomer/methacrylate monomer with a substituted or unsubstituted bicyclic, non-aromatic hydrocarbon radical and at least one photoinitiator; and a method for coating and/or printing, in particular digital printing, of a substrate and/or a substrate surface, a kit and a substrate coated or printed, in particular digitally printed, with the UV-curable composition.

16 Claims, No Drawings

UV-CURABLE COMPOSITION FOR COATING OR PRINTING OF A SUBSTRATE AND/OR A SUBSTRATE SURFACE

FIELD OF APPLICATION AND PRIOR ART

The invention relates to a UV-curable composition for coating or printing of a substrate and/or a substrate surface, a coating or printing method, a kit and a substrate.

Digital printing technology, particularly ink-jet printing technology, is being used in industrial printing tasks to an increasing extent. Compared to similar methods, digital printing technology is characterized by increased flexibility because printing plates are dispensed with. A further advantage lies in the possibility of decorating objects of various shapes without contact directly, i.e. without using labels or stickers.

Of particular importance is direct decoration of sheets of all types, in particular for advertising purposes. The essential requirements for direct decoration include outstanding resistance of the decoration to mechanical influences and rapid curing of the decoration, which allows rapid production cycles. A further important criterion is that the spectrum of adhesion should be as broad as possible on numerous different substrates, in particular corresponding to the sheet materials used in the advertising industry. As examples in this connection, one can mention polyvinyl chloride, polymethyl methacrylate, polypropylene, polyethylene, acrylonitrile-butadiene-styrene copolymer and polystyrene.

Known colour formulations or inks are intended to achieve this object by using large amounts of photoinitiators. A drawback of this approach is that large amounts of substances that are hazardous to health are incorporated into the colour formulations or inks via the photoinitiators. Raw material costs are also increased.

Moreover, inks are known in which the required reactivity is achieved by means of a high content of multifunctional acrylate monomers. For example, WO 2011/135089 A1 discloses a UV-curable ink which, in addition to pigments, radical photoinitiators, dispersants and optionally further additives, comprises at least one polyfunctional alkoxylated and/or polyalkoxylated acrylate monomer.

A drawback of inks with polyfunctional or multifunctional acrylate monomers is that for particularly reactive compositions, a limited adhesion spectrum on various substrates is typical.

An ink-jet printer ink comprising at least one monofunctional (meth)acrylate monomer, at least one monofunctional monomer selected from an N-vinyl amide, an N-acryloyl amine or a mixture thereof, at least one radical photoinitiator and at least one dye is known from WO 2007/129017 A1.

OBJECT AND MEANS FOR ACHIEVING OBJECT

The object of the invention is therefore to provide a UV-curable composition that makes it possible to avoid the drawbacks of conventional UV-curable compositions and is characterized, in particular in carrying out direct decorations, by highly favourable resistance to mechanical influences and by rapid curing of the direct decorations. A further object of the invention is to provide a coating or printing method, a kit and a coated or printed substrate.

These objects are achieved by means of a UV-curable composition having the features as described in the appended claims, a method as described in the appended claims, a kit as described in the appended claims and a substrate. Preferred embodiments of the invention are defined in the dependent claims and in the description. The wording of all claims is hereby expressly incorporated into the contents of the description by reference.

According to a first aspect, the invention relates to a UV-curable composition for coating or printing, in particular digital printing, of a substrate and/or a substrate surface.

The substrate can be a substrate having a sheet-like configuration, i.e. a sheet.

The substrate can in particular comprise a material or be composed of material selected from the group composed of polyvinyl chloride, polymethyl methacrylate, polypropylene, polyethylene, acrylonitrile-butadiene-styrene copolymer, polystyrene, copolymers of at least two of said materials and blends, i.e. mixtures, of at least two of said materials.

The UV-curable composition comprises the following:
- at least one monofunctional acrylate monomer/methacrylate monomer with a substituted or unsubstituted monocycloaliphatic hydrocarbon radical, i.e. at least one monofunctional acrylate monomer with a substituted or unsubstituted monocycloaliphatic hydrocarbon radical and/or at least one monofunctional methacrylate monomer with a substituted or unsubstituted monocycloaliphatic hydrocarbon radical,
- at least one monofunctional acrylate monomer/methacrylate monomer with a substituted or unsubstituted heterocyclic, non-aromatic organic radical, i.e. at least one monofunctional acrylate monomer with a substituted or unsubstituted heterocyclic, non-aromatic organic radical and/or at least one monofunctional methacrylate monomer with a substituted or unsubstituted heterocyclic, non-aromatic organic radical,
- at least one monofunctional acrylate monomer/methacrylate monomer with a substituted or unsubstituted bicyclic, non-aromatic hydrocarbon radical, i.e. at least one monofunctional acrylate monomer with a substituted or unsubstituted bicyclic, non-aromatic hydrocarbon radical and/or at least one monofunctional methacrylate monomer with a substituted or unsubstituted bicyclic, non-aromatic hydrocarbon radical, and
- at least one photoinitiator.

The term "monofunctional acrylate monomer" is to be understood within the meaning of the present invention as referring to a monomer with only one acrylic group per monomer molecule.

The term "multifunctional acrylate monomer" is to be understood within the meaning of the present invention as referring to a monomer with two or more acrylic groups per monomer molecule.

The term "monofunctional methacrylate monomer" is to be understood within the meaning of the present invention as referring to a monomer with only one methacrylic group per monomer molecule.

The term "multifunctional methacrylate monomer" is to be understood within the meaning of the present invention as referring to a monomer with two or more methacrylic groups per monomer molecule.

The term "monocycloaliphatic hydrocarbon radical" is to be understood within the meaning of the present invention as referring to an aliphatic hydrocarbon radical, in particular an alkyl, alkenyl or alkinyl radical, that comprises only a single hydrocarbon ring or is composed of only a single hydrocarbon ring.

The term "heterocyclic, non-aromatic organic radical" is to be understood within the meaning of the present invention as referring to a non-aromatic organic radical comprising a ring or a plurality of rings or composed of a ring or a plurality of rings, wherein the ring or rings comprise(s), in addition to ring-forming carbon atoms, at least one ring-forming heteroatom, in particular two ring-forming heteroatoms, such as e.g. an oxygen atom and/or a nitrogen atom or two oxygen atoms.

The term "bicyclic, non-aromatic hydrocarbon radical" is to be understood within the meaning of the present invention as referring to an aliphatic hydrocarbon radical, in particular an alkyl, alkenyl or alkinyl radical, which comprises two linked hydrocarbon rings or is composed of two linked hydrocarbon rings. Depending on the type of linkage of the rings, the bicyclic, non-aromatic hydrocarbon radical can be a fused bicyclic hydrocarbon radical, a spirocyclic hydrocarbon radical or a bridged bicyclic hydrocarbon radical. Preferably, the bicyclic, non-aromatic hydrocarbon radical is a bridged bicyclic hydrocarbon radical.

The term "UV-curable composition" is to be understood within the meaning of the present invention as referring to a composition that can be partially or completely cured under the action of ultraviolet radiation (UV radiation).

The term "ultraviolet radiation (UV radiation)" is to be understood within the meaning of the present invention as referring to radiation in a wavelength range of 100 nm to 450 nm, and in particular 100 nm to 420 nm.

Surprisingly, it has been found that a composition comprising the types of monofunctional acrylate monomers and/or monofunctional methacrylate monomers described above and explained in further detail below is particularly suitable as a UV-curable composition for coating or printing, in particular digital printing, of substrates and/or substrate surfaces. The composition according to the invention is advantageously characterized by outstanding reactivity and in particular rapid curing, sufficient adhesion capacity on numerous substrates and/or substrate surfaces, reduced blocking resistance, i.e. a reduced tendency to undergo bonding on stacking, joining, or winding up of two or more coated or printed, in particular digitally printed, substrates, in particular under increased pressure and/or increased temperature and—in a UV-cured state mechanical robustness, in particular weather resistance.

A further advantage is that the composition according to the invention can comprise smaller amounts of a photoinitiator compared to conventional UV-curable compositions. This makes it possible to reduce health risks, and in particular production costs, in a particularly advantageous manner.

In an embodiment of the invention, the substituted or unsubstituted monocycloaliphatic hydrocarbon radical is a monocycloalkyl radical, in particular with 3 ring-forming carbon atoms to 8 ring-forming carbon atoms, and preferably 5 ring-forming carbon atoms or 6 ring-forming carbon atoms.

In a further embodiment of the invention, the at least one monofunctional acrylate monomer/methacrylate monomer with a substituted or unsubstituted monocycloaliphatic hydrocarbon radical is selected from the group composed of 3,3,5-trimethylcyclohexyl acrylate, 2-(1,1-dimethylethyl) cyclohexyl acrylate, 3-(1,1-dimethylethyl)cyclohexyl acrylate, 4-(1,1-dimethylethyl)cyclohexyl acrylate, 4-tert-butylcyclohexyl acrylate, 4-tert-butylcyclohexyl methacrylate, cyclohexyl methacrylate, 3,3,5-trimethylcyclohexyl methacrylate and mixtures of at least two of said monofunctional acrylate monomers/methacrylate monomers.

Preferably, the at least one monofunctional acrylate monomer with a substituted or unsubstituted monocycloaliphatic hydrocarbon radical is 4-tert-butylcyclohexyl methacrylate and/or the at least one monofunctional methacrylate monomer with a substituted or unsubstituted monocycloaliphatic hydrocarbon radical is 3,3,5-trimethylcyclohexyl acrylate.

In a further embodiment of the invention, the at least one monofunctional acrylate monomer/methacrylate monomer with a substituted or unsubstituted monocycloaliphatic hydrocarbon radical is contained in an amount of 5% by weight to 35% by weight, in particular 5% by weight to 30% by weight, in particular 10% by weight to 25% by weight, and preferably 15% by weight to 25% by weight, based on the total weight of the composition.

In a further embodiment of the invention, the UV-curable composition is free of a monofunctional acrylate monomer/methacrylate monomer with a substituted or unsubstituted linear, i.e. non-cyclic, aliphatic hydrocarbon radical.

In a further embodiment of the invention, the heterocyclic, non-aromatic organic radical is a heterocycloalkyl radical, in particular with 3 ring-forming atoms to 8 ring-forming atoms, and preferably 5 ring-forming atoms or 6 ring-forming atoms.

In a further embodiment of the invention, the at least one monofunctional acrylate monomer/methacrylate monomer with a substituted or unsubstituted heterocyclic, non-aromatic organic radical is selected from the group composed of N-acryloylmorpholine, cyclic trimethylolpropane formal acrylate, tetrahydrofurfuryl acrylate and mixtures of at least two of said monofunctional acrylate monomers/methacrylate monomers.

Preferably, the at least one monofunctional acrylate monomer with a substituted or unsubstituted heterocyclic, non-aromatic organic radical is N-acryloylmorpholine.

In a further embodiment of the invention, the at least one monofunctional acrylate monomer/methacrylate monomer with a substituted or unsubstituted heterocyclic, non-aromatic organic radical is contained in an amount of 20% by weight to 40% by weight, in particular 25% by weight to 40% by weight, and preferably 30% by weight to 40% by weight, based on the total weight of the composition.

In a further embodiment of the invention, the bicyclic, non-aromatic hydrocarbon radical is a bridged hydrocarbon radical.

In a further embodiment of the invention, the at least one monofunctional acrylate monomer/methacrylate monomer with a substituted or unsubstituted bicyclic, non-aromatic hydrocarbon radical is selected from the group composed of isobornyl acrylate, isobornyl methacrylate, dihydrocyclopentadienyl acrylate, ethoxylated dihydrocyclopentadienyl acrylate and mixtures of at least two of said monofunctional acrylate monomers/methacrylate monomers.

Preferably, the at least one monofunctional acrylate monomer with a substituted or unsubstituted bicyclic, non-aromatic hydrocarbon radical is isobornyl acrylate.

In a further embodiment of the invention, the at least one monofunctional acrylate monomer/methacrylate monomer with a substituted or unsubstituted bicyclic, non-aromatic hydrocarbon radical is contained in an amount of 5% by weight to 30% by weight, in particular 10% by weight to 25% by weight, and preferably 15% by weight to 25% by weight, based on the total weight of the composition.

In a further embodiment of the invention, the molar mass ratio of the at least one monofunctional acrylate monomer/methacrylate monomer with a substituted or unsubstituted heterocyclic, non-aromatic organic radical to the at least one monofunctional acrylate monomer/methacrylate monomer with a substituted or unsubstituted bicyclic, non-aromatic hydrocarbon radical is >1.

Preferably, the at least one monofunctional acrylate monomer with a substituted or unsubstituted heterocyclic, non-aromatic organic radical is N-acryloylmorpholine, and the at least one monofunctional acrylate monomer with a substituted or unsubstituted bicyclic, non-aromatic hydrocarbon radical is isobornyl acrylate.

In a further embodiment of the invention, the molar ratio of the sum of the at least one monofunctional acrylate monomer/methacrylate monomer with a substituted or unsubstituted heterocyclic, non-aromatic organic radical and the at least one monofunctional acrylate monomer/methacrylate monomer with a substituted or unsubstituted bicyclic, non-aromatic hydrocarbon radical to the at least one monofunctional acrylate monomer/methacrylate monomer with a substituted or unsubstituted monocycloaliphatic hydrocarbon radical is in the range of 1 to 8, preferably 1 to 5, more preferably 2 to 4, and in particular 3 to 4. The advantages of the invention come to the fore in a particularly strong manner at the molar ratios disclosed in this paragraph.

According to the invention, it can further be preferred for the UV-curable composition also to comprise at least one N-vinyl monomer. In particular, the UV-curable composition can comprise a mixture of the at least one monofunctional acrylate monomer/methacrylate monomer with a substituted or unsubstituted heterocyclic, non-aromatic organic radical and at least one N-vinyl monomer. In this respect, a further surprising finding is that such a mixture or combination makes it possible to achieve a higher curing speed of the UV-curable composition.

The at least one N-vinyl monomer can be selected from the group composed of N-vinylpyrrolidone, N-vinylpiperidone, N-vinylcaprolactam, N-vinylimidazole, methylated N-vinylimidazole, N-vinylformamide and mixtures of at least two of said N-vinyl monomers.

Moreover, the at least one N-vinyl monomer can be contained in an amount of 20% by weight to 40% by weight, in particular 25% by weight to 40% by weight, and preferably 30% by weight to 40% by weight, based on the total weight of the composition.

In particular, a mixture of the at least one monofunctional acrylate monomer/methacrylate monomer with a substituted or unsubstituted heterocyclic, non-aromatic organic radical and the at least one N-vinyl monomer can be contained in an amount of 20% by weight to 40% by weight, in particular 25% by weight to 40% by weight, and preferably 30% by weight to 40% by weight, based on the total weight of the composition.

In a further embodiment of the invention, the at least one photoinitiator is of Norrish type I.

The term "photoinitiator of Norrish type I" is to be understood within the meaning of the present invention as referring to a photoinitiator which, in particular under the action of ultraviolet radiation (UV radiation), decomposes into two radicals, usually by an α-cleavage. The radicals formed can trigger chain polymerization and/or crosslinking accompanied by partial or complete curing of the composition.

The at least one photoinitiator is preferably selected from the group composed of 2-hydroxy-1-(4-[4-(2-hydroxy-2-methyl-propionyl)-benzyl]-phenyl)-2-methyl-propan-1-one, 1-hydroxycyclohexyl-phenyl-ketone, phenylbis-(2,4,6-trimethylbenzoyl)-phosphine oxide, 2-benzyl-2-dimethylamino-1-(4-morpholino-phenyl)-butanone-1,2,4,6-trimethylbenzoyl-diphenyl-phosphine oxide, 2-dimethylamino-2-(4-methyl-benzyl)-1-(4-morpholin-4-yl-phenyl)-butan-1-one, 2-hydroxy-2-methyl-1-phenyl-propan-1-one, 2-hydroxy-2-methylpropriophenone, 2,2-dimethoxy-2-phenylacetophenone, 2-methyl-1[4-(methylthio)phenyl]-2-morpholinopropan-1-one and mixtures of at least two of said photoinitiators.

In a further embodiment of the invention, the at least one photoinitiator is contained in an amount of <15% by weight, in particular 1% by weight to 14% by weight, based on the total weight of the composition. As mentioned above, a low content of photoinitiators, in particular as described in this paragraph, is advantageous in that the UV-curable composition carries no or little risk of adverse effects on health, and in particular can be inexpensively produced.

In a further embodiment of the invention, the UV-curable composition further comprises at least one colouring agent, preferably at least one pigment. In other words, it can be preferable according to the invention for the UV-curable composition to be a UV-curable ink or a UV-curable ink composition.

The at least one pigment can in particular be selected from the group composed of titanium dioxide, carbon black, aluminium, inorganic pigments, organic pigments and mixtures of at least two of said pigments.

Preferably, the at least one pigment is an organic pigment, in particular selected from the group composed of pigments based on quinacridones, pigments based on isoindolines, pigments based on isoindolinones, pigments based on phtalocyanines, pigments based on benzimidazolones and mixtures of at least two of said pigments.

Moreover, the at least one colouring agent, preferably the at least one pigment, can be contained in an amount of 0.1% by weight to 20% by weight, in particular 0.3% by weight to 18% by weight and preferably 1% by weight to 18% by weight, based on the total weight of the composition.

In a further embodiment of the invention, the UV-curable composition is free of colouring agents and/or pigments, in particular free of colouring agents. For example, the composition according to the invention can be a UV-curable composition for producing a so-called covering layer, i.e. a final covering or final layer (finish) of a coating, such as a label, a sticker or a direct decoration.

Moreover, the UV-curable composition can further comprise a non-UV-reactive polymer.

The term "non-UV-reactive polymer" is to be understood within the meaning of the present invention as referring to a polymer that is not crosslinkable under the action of ultraviolet radiation (UV radiation).

By means of a non-UV-reactive polymer, one can advantageously further improve the adhesion of the UV-curable composition to a substrate and/or a substrate surface and its blocking resistance.

Preferably, the non-UV-reactive polymer is an aldehyde and/or ketone and/or polyester resin.

The non-UV-reactive polymer can be contained in an amount of 0.5% by weight to 5.0% by weight, in particular 0.8% by weight to 5.0% by weight, and preferably 1.5% by weight to 5.0% by weight, based on the total weight of the composition.

In a further embodiment of the invention, the UV-curable composition further comprises a solid resin, in particular a partially acrylated solid resin. Preferably, the UV-curable composition comprises a solution of the solid resin in an acrylate monomer, in particular 2-phenoxyethyl acrylate or isobornyl acrylate.

The term "partially acrylated solid resin" is to be understood within the meaning of the present invention as referring to a solid resin that is partially functionalized with acrylic groups.

By means of a partially acrylated solid resin, one can particularly advantageously further improve the printing quality due to improved drop formation and the mechanical properties of the cured composition, such as e.g. scratch resistance and/or adhesive strength.

The partially acrylated solid resin can be selected from the group composed of aldehyde resins, ketone resins, polyester resins and mixtures of at least two of said partially acrylated solid resins.

Moreover, the partially acrylated solid resin can be contained in an amount of 1% by weight to 10% by weight, in particular 3% by weight to 10% by weight, and preferably 5% by weight to 10% by weight, based on the total weight of the composition.

Moreover, the UV-curable composition can further comprise at least one additive selected from the group composed of a multifunctional acrylate monomer, a multifunctional methacrylate monomer, a multifunctional oligomer, a stabilizer, a wetting agent, a filler, a flow control agent, a lubricant and mixtures of at least two of said additives.

The term "multifunctional oligomer" is to be understood within the meaning of the present invention as referring to an oligomer comprising at least two different functional groups.

The term "flow control additive" is to be understood within the meaning of the present invention as referring to an additive that is configured to compensate for irregularities in the layer produced by applying the composition according to the invention to a substrate surface.

The multifunctional acrylate monomer can be selected from the group composed of (octahydro-4,7-methano-1H-indenediyl)bis(methylene) diacrylate, tricyclodecanedimethanol diacrylate, butanediol diacrylate, 1,2-ethylene glycol diacrylate, 1,12-dodecanol diacrylate, 1,10-decanediol diacrylate, esterdiol diacrylate, propoxylated 2-neopentyl glycol diacrylate, tris-(2-hydroxyethyl)-isocyanurate triacrylate, propoxylated neopentyl glycol diacrylate, hexanediol diacrylate, tripropylene glycol diacrylate, tetraethylene glycol diacrylate, dipropylene glycol diacrylate, ethoxylated bisphenol A diacrylate, alkoxylated hexanediol diacrylate, 3-methyl-1,5-pentanediol diacrylate, alkoxylated cyclohexanedimethanol diacrylate, tricyclodecanedimethanol diacrylate, trimethylolpropane triacrylate, alkoxylated trimethylolpropane triacrylate, ethoxylated trimethylolpropane triacrylate, glycerol propoxylate triacrylate, pentaerythritol triacrylate, dipentaerythritol pentaacrylate, dipentaerythritol hexaacrylate, ethoxylated pentaerythritol tetraacrylate, pentaerythritol tetraacrylate, di(trimethylolpropane) tetraacrylate, polyethylene glycol diacrylate and mixtures of at least two of said multifunctional acrylate monomers.

The multifunctional acrylate monomer can be contained in an amount of 0.1% by weight to 2.0% by weight, in particular 0.3% by weight to 2.0% by weight, and preferably 0.5% by weight to 2.0% by weight, based on the total weight of the composition.

The multifunctional methacrylate monomer can be selected from the group composed of 1,12-dodecanol dimethacrylate, hexanediol dimethacrylate, ethoxylated bisphenol A dimethacrylate, trimethylolpropane trimethacrylate, pentaerythritol tetramethacrylate and mixtures of at least two of said multifunctional methacrylate monomers.

The multifunctional methacrylate monomer can be contained in an amount of 0.1% by weight to 5.0% by weight, in particular 0.5% by weight to 5.0% by weight, and preferably 0.8% by weight to 5.0% by weight, based on the total weight of the composition.

Preferably, the multifunctional acrylate monomer and the multifunctional methacrylate monomer together can be contained in an amount of <15% by weight, in particular 5% by weight to 10% by weight, preferably 1% by weight to 7% by weight, based on the total weight of the composition.

The multifunctional oligomer can be selected from the group composed of polyethers, acrylates and mixtures of at least two of said multifunctional oligomers.

The multifunctional oligomer can be contained in an amount of 0.5% by weight to 6.5% by weight, in particular 0.8% by weight to 6.5% by weight, and preferably 1.0% by weight to 6.5% by weight, based on the total weight of the composition.

According to a second aspect, the invention relates to a method for coating or printing, in particular digital printing, of a substrate and/or a substrate surface, wherein the method comprises the following steps:
  coating or printing, in particular digital printing, of a substrate and/or a substrate surface with a UV-curable composition according to the first aspect of the invention and
  UV curing of the UV-curable composition.

Preferably, the UV-curable composition is printed on the substrate and/or the substrate surface by means of a digital printing process, in particular an ink-jet printing process.

The term "digital printing process" is to be understood within the meaning of the present invention as referring to a printing process in which the print image is directly transferred from a computer to a printing machine without using a static or solid printing plate.

The term "ink-jet printing process" is to be understood within the meaning of the present invention as referring to a process in which small droplets of liquid ink are produced and applied to a substrate and/or a substrate surface. On the one hand, this process can involve use of a continuous ink jet (CIJ), or on the other, discontinuous production of individual drops that are produced and transferred to the substrate only when needed (drop on demand, DOD).

The substrate and/or the substrate surface can generally be coated or printed with the UV-curable composition only partially or completely, i.e. over the entire surface.

With respect to further features and advantages of the process, in order to avoid repetition, reference is made to the explanations given in the context of the first aspect of the invention. The features and advantages described therein, in particular with respect to the UV-curable composition, also apply mutatis mutandis to the process according to the second aspect of the invention.

According to a third aspect, the invention relates to a kit, in particular in the form of an ink set, for coating or printing, in particular digital printing, of a substrate and/or a substrate surface.

The kit comprises, spatially separated from one another,
  at least two UV-curable compositions according to the first aspect of the invention that are distinguishable from one another, in particular at least two colouring-agent-containing, preferably pigment-containing, UV-curable compositions according to the first aspect of the invention that are distinguishable from one another, and/or
  at least one UV-curable composition according to the first aspect of the invention, in particular at least one colouring-agent-containing, preferably pigment-containing, UV-curable composition according to the first aspect of the invention, and a non-UV-curable composition, and/or at least one UV-curable composition according to the first aspect of the invention, in particular at least one colouring-agent-containing, preferably pigment-containing, UV-curable composition according to the first aspect of the invention, and at least one further component selected from the group composed of a UV lamp, an LED emitter, an LED UV dryer, a digital print head, a digital printing system, pigment dispersions and combinations of at least two of said components.

Preferably, the at least two UV-curable compositions according to the first aspect of the invention that are distinguishable from one another differ with respect to a or the colouring agent, in particular with respect to a or the pigment.

For example, the UV lamp can be a mercury lamp.

For example, the digital print head can be an ink-jet print head.

For example, the digital printing system can be an ink-jet printing system.

For example, the pigment dispersions can be pigment dispersions for producing a white, coloured, metallic or colourless ink.

In particular, the pigment dispersions can be titanium-dioxide-containing dispersions, carbon-black-containing dispersions, aluminium-containing dispersions, inorganic pigment dispersions, organic pigment dispersions or mixtures of at least two of said pigment dispersions.

With respect to further features and advantages of the kit, in order to avoid repetition, reference is made to the above description, in particular to the explanations given in the context of the first aspect of the invention. The features and advantages described therein, in particular with respect to the UV-curable composition, also apply mutatis mutandis to the kit according to the third aspect of the invention.

According to a fourth aspect, the invention relates to a substrate that is coated or printed, in particular digitally printed, with a UV-curable composition according to the first aspect of the invention.

The substrate can be a substrate having a sheet-like configuration, i.e. a sheet.

The substrate can in particular comprise or be composed of a material selected from the group composed of polyvinyl chloride, polymethyl methacrylate, polypropylene, polyethylene, acrylonitrile-butadiene-styrene copolymer, polystyrene, copolymers of at least two of said materials and blends, i.e. mixtures, of at least two of said materials.

With respect to further features and advantages of the substrate, in order to avoid repetition, reference is made to the above description, in particular to the explanations given in the context of the first aspect of the invention. The features and advantages described therein, in particular with respect to the UV-curable composition, also apply mutatis mutandis to the substrate according to the fourth aspect of the invention.

Further features and advantages of the invention are given in the following description of preferred embodiments in the form of examples. Individual features thereof can be realized individually or in combination with one another. The examples given below serve only to further explain the invention, without limiting the invention to the disclosed content of the examples.

EXAMPLE SECTION

Samples of the inks applied with a 12 μm doctor blade to PP web sheet material were compared. Curing was carried out using a UV belt drier from the firm IST, model M-20-2x1-TR-CMK-SLC, at 366 nm and 120 W/cm, belt speed 20 m/min.

The comparison of doctor blade drawdowns eliminated any machine and software effects on the printing test, yielding the following results.

Evaluation:

Blocking (bonding together after stacking): Samples measuring 10×10 cm were stacked for 12 hours immediately after UV curing and loaded with an additional weight of 4 kg. After this period, the samples were to show no adhesion to one another.

Adhesion: according to ISO240, cross-cut with Sellotape test. GT0=no damage, GT5=complete detachment.

Comparison Ink 1:

The comparison ink comprised the following components (in % by weight):

| Aliphatic urethane diacrylate[7] | 2.6% |
|---|---|
| Monofunctional monomer[1] | 16.0% |
| IBOA[1] | 34.7% |
| ACMO[1] | 10.2% |
| Multifunctional monomer[2] | 0.2% |
| Flow control additive | 0.1% |
| UV cyan paste[3] | 11.7% |
| Amine compound[4] | 3.1% |
| Photoinitiator Norrish I | 13.2% |
| Rokracure 7250[5] | 8.2% |

The ink was found to be insufficiently reactive. The UV-cured press proof (colour on colour) showed blocking on application of a 4 kg weight for 12 h.

Comparison Ink 2:

The comparison ink comprised the following components (in % by weight):

| Aliphatic urethane diacrylate[7] | 5.7% |
|---|---|
| Monofunctional monomer[1] | 31.9% |
| IBOA[1] | 27.0% |
| ACMO[1] | 12.6% |
| Multifunctional monomer[2] | 5.1% |
| Flow control additive | 0.1% |
| Stabilizer | 0.1% |
| Norrish I photoinitiator | 10.0% |
| UV cyan paste[3] | 7.5% |

It was found that both the adhesion and the reactivity of the ink were insufficient. After UV curing, a cross-cut score of 5 (GT5; very poor adhesive strength) was observed on a polypropylene substrate. Moreover, the UV-cured press proof (colour on colour) showed blocking on loading with a weight of 4 kg for 12 h.

Comparison Example 3:

| Aliphatic polyetherpolyol acrylate[7] | 1.8% |
|---|---|
| IBOA[1] | 17.0% |
| ACMO[1] | 17.0% |
| TMCHA[1] | 42.6% |
| Multifunctional monomer[2] | 1.0% |
| Flow control additive | 0.1% |
| Stabilizer | 0.1% |
| UV black paste[3] | 5.5% |
| Norrish I photoinitiator | 10.0% |
| Binder, not UV-curing | 4.90% |

It was found that both the adhesion and the reactivity of the ink were not sufficient. After UV curing, a cross-cut score of 5 (GT5; very poor adhesive strength) was observed on a polypropylene substrate. Moreover, the UV-cured press proof (colour on colour) showed blocking on loading with a weight of 4 kg for 12 h.

Comparison Example 4:

| | |
|---|---|
| Aliphatic polyetherpolyol acrylate[7] | 1.8% |
| IBOA[1] | 62.6% |
| ACMO[1] | 2.0% |
| TBCH[1] | 12.0% |
| Multifunctional monomer[2] | 1.0% |
| Flow control additive | 0.1% |
| Stabilizer | 0.1% |
| UV black paste[3] | 5.5% |
| Norrish I photoinitiator | 10.0% |
| Binder, not UV-curing | 4.90% |

It was found that both the adhesion and the reactivity of the ink were not sufficient. After UV curing, a cross-cut score of 5 (GT5; very poor adhesive strength) was observed on a polypropylene substrate. Moreover, the UV-cured press proof (colour on colour) showed blocking on loading with a weight of 4 kg for 12 h.

Comparison Example 5:

| | |
|---|---|
| Aliphatic polyetherpolyol acrylate[7] | 1.8% |
| IBOA[1] | 2.0% |
| ACMO[1] | 58.6% |
| TMCHA[1] | 16.0% |
| Multifunctional monomer[2] | 1.0% |
| Flow control additive | 0.1% |
| Stabilizer | 0.1% |
| UV black paste[3] | 5.5% |
| Norrish I photoinitiator | 10.0% |
| Binder, not UV-curing | 4.90% |

It was found that, indeed, the reactivity of the ink was good, but the adhesion was not sufficient. After UV curing, a cross-cut score of 5 (GT5; very poor adhesive strength) was observed on a polypropylene substrate.

3. UV-Curable Composition According to the Invention:

The composition according to the invention was a pigment-containing UV-curable composition (ink) comprising the following components (in % by weight):

| | |
|---|---|
| IBOA[1] | 20.2% |
| ACMO[1] | 37.0% |
| TBCH[1] | 19.1% |
| Flow control additive | 0.1% |
| Stabilizer | 0.1% |
| Norrish I photoinitiator | 11.5% |
| Rokracure 7250[5] | 4.5% |
| UV cyan paste[3] | 7.5% |

The adhesion of the composition was found to be highly favourable. In curing of 20 m/min-40 m/min, a cross-cut score of 0 (GT0; very good adhesive strength) was observed on both a polypropylene substrate and a hard polyvinyl chloride substrate.

Legend:
1) Monofunctional acrylate monomers/methacrylate monomers
   IBOA: Isobornyl acrylate
   ACMO: N-acryloylmorpholine
   TBCH: 4-tert-butylcyclohexyl acrylate
   TMCHA: 3,3,5-trimethylcyclohexyl acrylate 2) Multifunctional monomers
   difunctional monomers here in this example
3) Commercially available pigment pastes with a monofunctional acrylate monomer content of 30-70%.
4) Amine compound (Synergist)
5) Partially acrylated solid resin dissolved in monofunctional monomer
6) Trifunctional monomers
   e.g. ethoxylated (3) trimethylol propane triacrylate
7) Aliphatic urethane diacrylate 30% in monofunctional monomer 4. Further UV-Curable Compositions According to the Invention:

The following respective compositions 4.1-4.4 according to the invention are pigment-containing inks that can be supplemented with further additives, in particular wetting agents and stabilizers.

4.1. UV-Curable Ink Base (Yellow):

| | Monomer | [M %] |
|---|---|---|
| | Norrish type I photoinitiator | 10.0 |
| | Monofunctional monomer | 6.7 |
| | IBOA | 17.1 |
| | ACMO | 31.9 |
| | TMCHA | 16.5 |
| | Multifunct. oligomer | 1.0 |
| | Multifunct. monomer | 1.8 |
| UV pigment paste monofunct. monomer | Yellow (pigment content 20%) | 15.0 |

4.2. UV-Curable Ink Base (Magenta):

| | Monomer | [M %] |
|---|---|---|
| | Norrish type I photoinitiator | 10.0 |
| | Monofunctional monomer | 4.8 |
| | IBOA | 16.0 |
| | ACMO | 31.9 |
| | TMCHA | 16.5 |
| | Multifunct. oligomer | 1.0 |
| | Multifunct. monomer | 1.8 |
| UV pigment paste monofunctional monomer | Magenta (pigment content 20%) | 18.0 |

4.3. UV-Curable Ink Base (Cyan):

| | Monomer | [M %] |
|---|---|---|
| | Norrish type I photoinitiator | 10.0 |
| | Monofunctional monomer | 5.9 |
| | IBOA | 18.2 |
| | ACMO | 32.0 |
| | TBCH | 20.0 |
| | Multifunct. oligomer | 2.8 |
| | Multifunct. monomer | 1.8 |
| UV pigment paste monofunctional monomer | Cyan (pigment content 20%) | 9.3 |

4.4. UV-Curable Ink Base (Black):

| | Monomer | [M %] |
|---|---|---|
| | Norrish type I photoinitiator | 13.3 |
| | Monofunctional monomer | 5.5 |
| | IBOA | 20.8 |
| | ACMO | 33.4 |

-continued

| | Monomer | [M %] |
|---|---|---|
| | TMCHA | 17.4 |
| | Multifunct. oligomer | 2.2 |
| | Multifunct. monomer | 2.5 |
| UV pigment paste monofunctional monomer | Black (pigment content 40%) | 4.90 |

Legend:
IBOA: Isobornyl acrylate
ACMO: N-acryloylmorpholine
TBCH: 4-tert-butylcylohexyl acrylate
TMCHA: 3,3,5-trimethylcyclohexyl acrylate

The invention claimed is:

1. A UV-curable composition for coating or printing a substrate and/or a substrate surface, comprising
at least one monofunctional acrylate monomer/methacrylate monomer with a substituted or unsubstituted monocycloaliphatic hydrocarbon radical,
at least one monofunctional acrylate monomer/methacrylate monomer with a substituted or unsubstituted heterocyclic, non-aromatic organic radical,
at least one monofunctional acrylate monomer/methacrylate monomer with a substituted or unsubstituted bicyclic, non-aromatic hydrocarbon radical and
at least one photoinitiator, wherein
a molar ratio of a sum of the at least one monofunctional acrylate monomer/methacrylate monomer with a substituted or unsubstituted heterocyclic, non-aromatic organic radical and the at least one monofunctional acrylate monomer/methacrylate monomer with a substituted or unsubstituted bicyclic, non-aromatic hydrocarbon radical to the at least one monofunctional acrylate monomer/methacrylate monomer with a substituted or unsubstituted monocycloaliphatic hydrocarbon radical is of 1 to 8, and
the at least one monofunctional methacrylate monomer with a substituted or unsubstituted monocycloaliphatic hydrocarbon radical is 4-tert-butylcyclohexylmethacrylate and/or the at least one monofunctional acrylate monomer with a substituted or unsubstituted monocycloaliphatic hydrocarbon radical is 4-tert-butylcyclohexyl acrylate and/or 3,3,5-trimethylcyclohexyl acrylate, the at least one monofunctional acrylate monomer with a substituted or unsubstituted heterocyclic, non-aromatic organic radical is N-acryloylmorpholine, and the at least one monofunctional acrylate monomer with a substituted or unsubstituted bicyclic, non-aromatic hydrocarbon radical is isobornyl acrylate.

2. The UV-curable composition according to claim 1, wherein the at least one monofunctional acrylate monomer/methacrylate monomer with a substituted or unsubstituted monocycloaliphatic hydrocarbon radical is contained in an amount of 5% by weight to 30% by weight or 10% by weight to 25% by weight or 15% by weight to 25% by weight based on the total weight of the composition.

3. The UV-curable composition according to claim 1, wherein the UV-curable composition is free of a monofunctional acrylate monomer/methacrylate monomer with a substituted or unsubstituted linear aliphatic hydrocarbon radical.

4. The UV-curable composition according to claim 1, wherein the at least one monofunctional acrylate monomer with a substituted or unsubstituted heterocyclic, non-aromatic organic radical is contained in an amount of 20% by weight to 40% by weight or 25% by weight to 40% by weight or 30% by weight to 40% by weight based on the total weight of the composition.

5. The UV-curable composition according to claim 1, wherein the at least one monofunctional acrylate monomer/methacrylate monomer with a substituted or unsubstituted bicyclic, non-aromatic hydrocarbon radical is contained in an amount of 5% by weight to 30% by weight or 10% by weight to 25% by weight or 15% by weight to 25% by weight based on the total weight of the composition.

6. The UV-curable composition according to claim 1, wherein the molar mass ratio of the at least one monofunctional acrylate monomer/methacrylate monomer with a substituted or unsubstituted heterocyclic, non-aromatic organic radical to the at least one monofunctional acrylate monomer/methacrylate monomer with a substituted or unsubstituted bicyclic, non-aromatic hydrocarbon radical is >1.

7. The UV-curable composition according to claim 1, wherein the molar ratio of the sum of the at least one monofunctional acrylate monomer/methacrylate monomer with a substituted or unsubstituted heterocyclic, non-aromatic organic radical and the at least one monofunctional acrylate monomer/methacrylate monomer with a substituted or unsubstituted bicyclic, non-aromatic hydrocarbon radical to the at least one monofunctional acrylate monomer/methacrylate monomer with a substituted or unsubstituted monocycloaliphatic hydrocarbon radical is in the range of 1 to 8, preferably 1 to 5, more preferably 2 to 4, and in particular 3 to 4.

8. The UV-curable composition according to claim 1, wherein the at least one photoinitiator is of Norrish type I selected from the group consisting of 2-hydroxy-1-(4-[4-(2-hydroxy-2-methyl-propionyl)-benzyl]-phenyl)-2-methyl-propan-1-one, 1-hydroxycyclohexyl-phenyl-ketone, phenyl-bis-(2,4,6-trimethylbenzoyl-)phosphine oxide, 2-benzyl-2-dimethylamino-1-(4-morpholino-phenyl)-butanone-1, 2,4,6-trimethylbenzoyl-diphenyl-phosphine oxide, 2-dimethylamino-2-(4-methyl-benzyl)-1-(4-morpholin-4-yl-phenyl)-butan-1-one, 2-hydroxy-2-methyl-1-phenyl-propan-1-one, 2-hydroxy-2-methylpropriophenone, 2,2-dimethoxy-2-phenylacetophenone, 2-methyl-1 [4-(methylthio)phenyl]-2-morpholinopropan-1-one and mixtures of at least two of said photoinitiators.

9. The UV-curable composition according to claim 1, wherein the at least one photoinitiator is contained in an amount of <15% by weight or 1% by weight to 14% by weight based on the total weight of the composition.

10. The UV-curable composition according to claim 1, wherein it further comprises at least one pigment selected from the group consisting of pigments based on quinacridones, pigments based on isoindolines, pigments based on isoindolinones, pigments based on phthalocyanines, pigments based on benzimidazolones and mixtures of at least two of said pigments.

11. The UV-curable composition according to claim 1, wherein it is free of coloring agents and/or pigments.

12. A method of coating or printing a substrate and/or a substrate surface, comprising:
coating or printing, a substrate surface with the UV-curable composition according to claim 1, and
UV curing of the composition.

13. A kit for coating or printing a substrate and/or a substrate surface, comprising, spatially separated from one another,
at least two of the UV-curable compositions according to claim 1 that are distinguishable from one another.

14. The UV-curable composition according to claim 1, wherein the printing is digital printing.

15. The method according to claim 12, wherein the printing is digital printing.

16. The kit according to claim 13, wherein the printing is digital printing.

* * * * *